Figure 1:
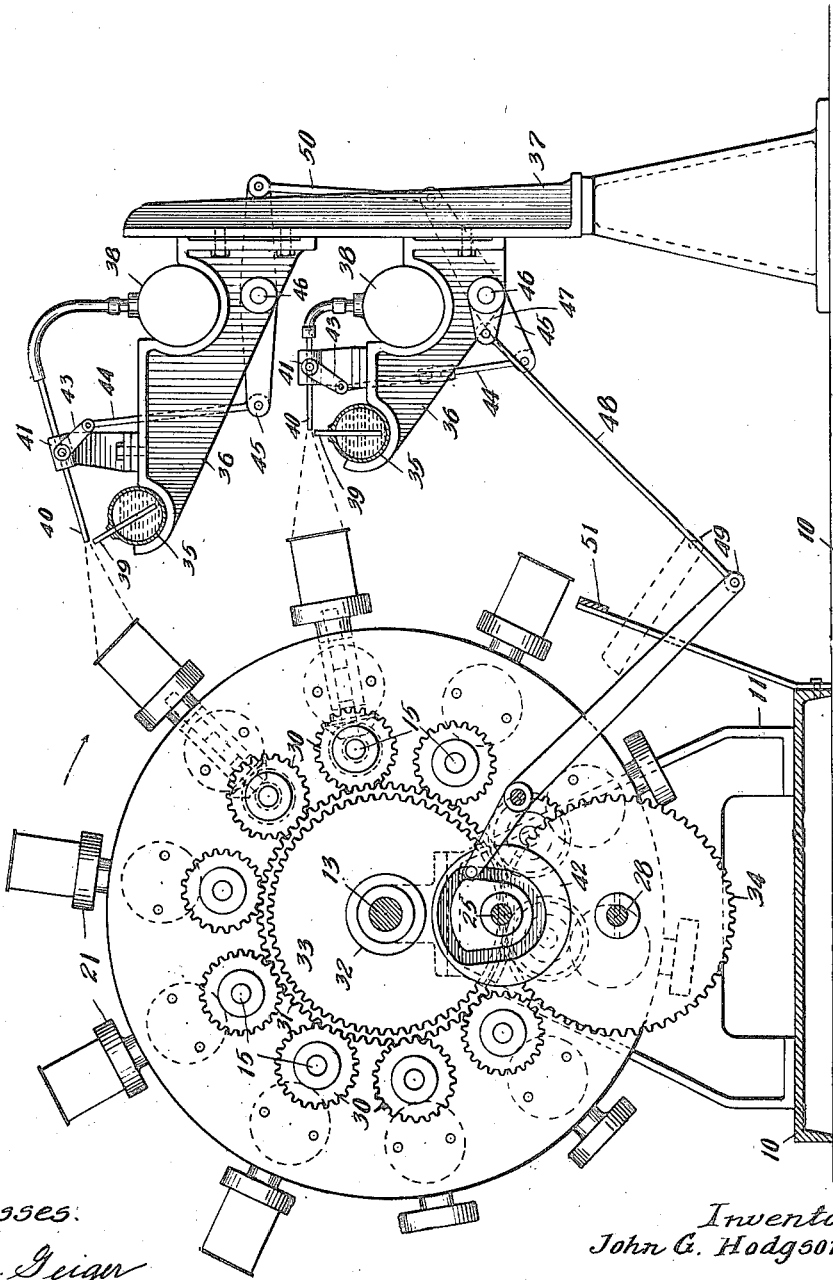

J. G. HODGSON.
CAN LACQUERING MACHINE.
APPLICATION FILED MAY 5, 1913.

1,227,619.

Patented May 29, 1917.
2 SHEETS—SHEET 1.

Witnesses:
Wm. Geiger
Esther Abrams.

Inventor:
John G. Hodgson
By Munday, Evarts, Adcock & Clarke.
Attys.

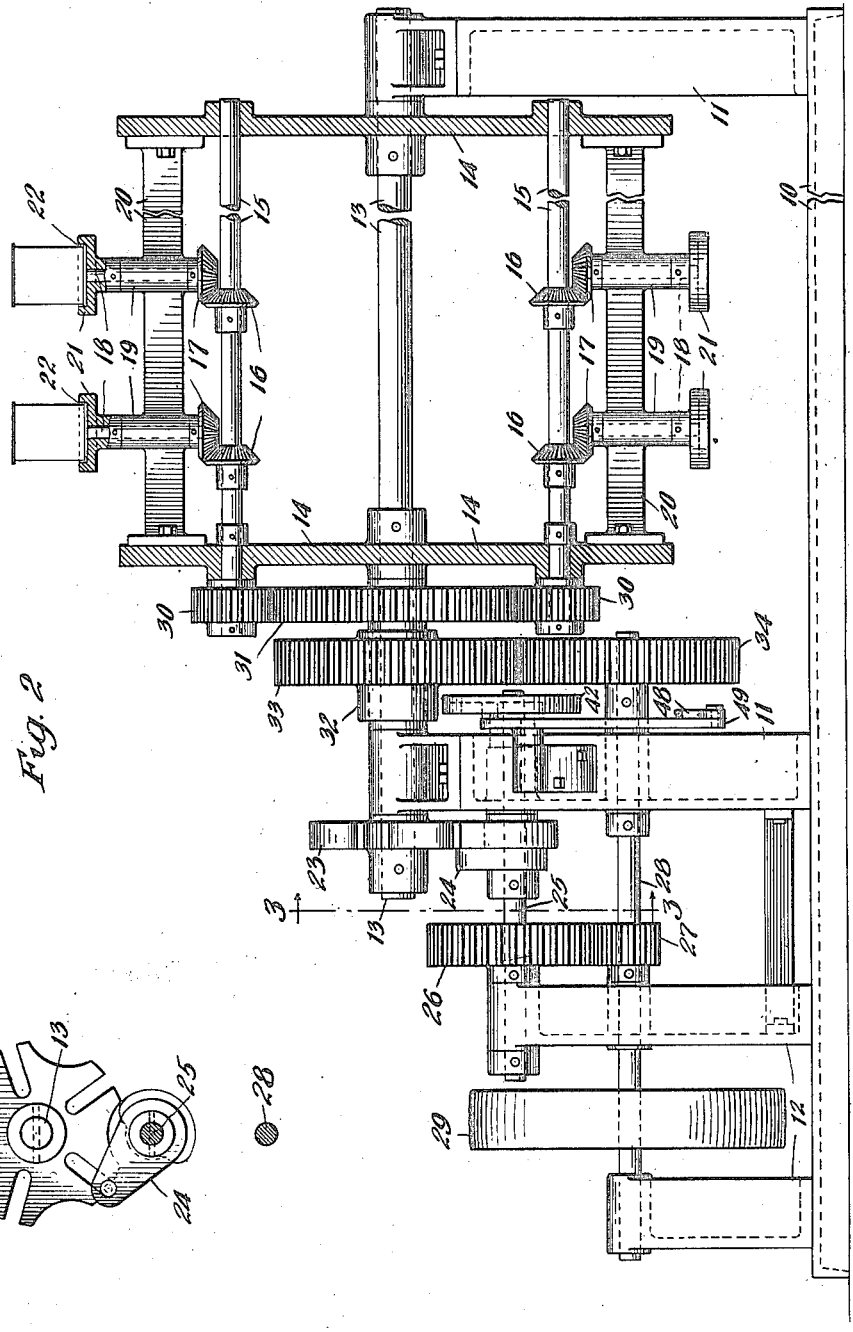

UNITED STATES PATENT OFFICE.

JOHN G. HODGSON, OF MAYWOOD, ILLINOIS, ASSIGNOR TO AMERICAN CAN COMPANY, OF NEW YORK, N. Y., A CORPORATION OF NEW YORK.

CAN-LACQUERING MACHINE.

1,227,619.  Specification of Letters Patent.  Patented May 29, 1917.

Application filed May 5, 1913. Serial No. 765,574.

*To all whom it may concern:*

Be it known that I, JOHN G. HODGSON, a citizen of the United States, residing in Maywood, in the county of Cook and State of Illinois, have invented a new and useful Improvement in Can-Lacquering Machines, of which the following is a specification.

This invention relates to improvements in can lacquering machines.

One object of the invention is to provide a machine for spraying or coating container vessels with a uniform layer or film of lacquer or other coating material, so arranged that any number of cans at a time may be sprayed one or more times or two or more groups sprayed simultaneously.

Another object of the invention is to provide a machine of the type above indicated of high capacity, few working parts and in which the lacquer is sprayed at an angle to the vessels while the latter are rotating.

The invention furthermore consists in the improvements in the parts and devices and in the novel combinations of the parts and devices herein shown, described and claimed.

In the drawing, Figure 1, is a vertical sectional view of a machine embodying my improvements. Fig. 2 is a longitudinal sectional view of the machine shown in Fig. 1, parts being broken away to prevent crowding of the drawing, and Fig. 3 is a detailed sectional view taken substantially on the line 3—3 of Fig. 2.

In said drawing the base of the machine is designated by the reference 10, and, as shown, said base is provided with a number of up-rights or standards 11 and 12, the standards 11 having bearings at their upper ends, in which is rotatably mounted a horizontally extending shaft 13, carrying a pair of disks 14, fixed to the shaft, said disk 14 having rotatably mounted therein a plurality of longitudinal extending shafts 15, each provided with a plurality of bevel gears 16, the latter meshing with corresponding bevel gears 17, secured to the inner ends of chuck spindles 18, the latter being rotatably mounted in suitable bearings 19, formed on longitudinally extending brackets 20, secured to the disks 14. Each chuck spindle 18 is provided at its outer end with a magnetized chuck 21, having a recess 22, therein adapted to receive a can or other article to be coated.

The carrier comprising the disks 14 and chucks carried thereby is intermittently rotated by means of the Geneva stop members 23, 24, the latter being mounted on a horizontal shaft 25, rotatably mounted in suitable bearings on the upper ends of the standards 11 and 12, the shaft 25 being continuously rotated through the intermediary of the gears 26 and 27, the latter being secured to a power shaft 28, driven from any suitable source of power (not shown) by means of the pulley 29.

The shafts 15 are continuously rotated by means of pinions 30 secured to the ends thereof, said pinions 30 meshing with a gear 31 secured to a hub 32 loosely rotatably mounted on shaft 13; the hub 32 having another gear 33 secured thereto and driven by a gear 34 on the inner end of the power shaft 28. By continuously rotating the shafts 15 and the chucks geared therewith the lacquer or other liquid coating sprayed within the can is evenly distributed while and as it dries and sets, after the can has passed away from the spraying device, and the collection of the liquid by gravity on any one side or part of the can is prevented.

Arranged longitudinally of the carrier, as more particularly shown in Fig. 1, are a plurality of spraying devices, the number of such spraying devices corresponding to the number of chucks on the carrier, and furthermore dependent upon the amount of rotation given the carrier by the Geneva stop movement during each step.

The spraying devices, as shown, each includes a lacquer supply tank 35 mounted on a bracket 36 secured to an up-right 37 and also mounted on each bracket 36 is a compressed air cylinder 38 connected with a suitable source of compressed air (not shown). For each series of chucks on the carrier a lacquer feed tube 39 is provided, the inner end of which dips into the lacquer in the tank 35 and the outer end of which is arranged adjacent the end of the compressed air pipe 40, the latter being in communication with the cylinder 38 as shown in Fig. 1. Each of the compressed air pipes 40 has included therein a valve 41, all of said valves 41 being simultaneously controlled and operated by means of a cam 42 mounted on the shaft 25 through the following mechanism. Each valve 41 is provided with a short lever arm 43, having pivotally connected thereto a connecting rod 44, the opposite end of which is pivotally connected to a lever 45, all of said levers 45 of each upper and lower series being secured to a shaft 46, the lower shaft 46 having a lever 47 to which is pivotally connected one end of a connecting rod 48, the opposite end of said connecting rod being pivotally secured to a lever 49, having a roller at its upper end engaging in the cam 42 and operated thereby. In order to operate the upper and lower series of spraying devices from the same cam, a connecting link 50 is secured to a lever 45 of each of the upper and lower series. After the cans have been sprayed the same may be removed from the chucks by any suitable means, such as a stationary knock-out bar 51.

During the spraying operation the cans are in a position relative to the compressed air pipe 40 of the upper spraying device, so that the lacquer or liquid coating is delivered at an angle diagonally into the mouth of the can and against one side thereof, which together with the continuous rotation of the can, evenly distributes the liquid coating on all parts of its interior surface. The relative positions of the can and spraying tube are best illustrated in the upper part of Fig. 1 of the drawings.

As shown in the drawing, the carrier is adapted to move one-fifth of a revolution during each step, and since there are ten series of radially extended chucks on the carrier, each set of cans will receive only one coating of the lacquer or other material, but as will be obvious the Geneva stop motion can be so arranged that the carrier be given only one-tenth of a revolution at each step, thereby providing for two coatings for each series of cans. In some instances it may be desirable to employ only one series of spraying devices, and in this case the carrier would only be rotated one-tenth of a revolution provided ten series of radially extending chucks were retained. In the drawing I have shown only two chucks in each longitudinally extending series, but as will be apparent to those skilled in the art this number may be decreased or increased as desired.

The chucks 21 are made preferably removable so that the same may be interchanged to accommodate cans of various sizes, and it will also be noted that the use of magnetized chucks adapts the same for holding can ends as well as the can bodies so that the machine is equally adapted for spraying bodies and ends.

I have herein shown and described what I now consider the preferred embodiment of my improvements but it will be understood that various changes and modifications may be made without departing from the spirit of the invention, and all such changes and modifications are contemplated as come within the scope of the claims appended hereto.

I claim:

1. A machine of the character described including, in combination: a carrier rotatable about a horizontal axis; radially directed can holding chucks bodily movable with said carrier and rotatable thereon; means for continuously rotating said chucks; a spraying device stationary relatively to said carrier and automatically operable to spray a coating of lacquer on cans carried by said chucks; and means for automatically operating said spraying device when, by the movement of the can, the axis of the can is inclined and the spraying device is directed into its open end and against its interior side surface.

2. A lacquering machine including, in combination: a carrier rotatable about a horizontal axis; a plurality of radially directed can-holding chucks rotatably mounted on said carrier and bodily movable therewith; means for continuously rotating said chucks; and two sets of spraying devices arranged adjacent said carrier, one set above the other, in front of which the articles carried by said chucks are adapted to be brought successively.

3. A lacquering machine including, in combination: a carrier rotatable about a horizontal axis; a plurality of sets of radially extending chucks rotatably mounted on said carrier and bodily movable therewith, each set of chucks including a plurality of chucks arranged longitudinally of the carrier; shafts 15 arranged longitudinally of the carrier and each operatively connected with the chucks of one of said sets; means for rotating said shafts to cause the rotation of the chucks; and a series of spraying devices extending longitudinally of the carrier and stationary relatively thereto, the number of said spraying devices corresponding to the number of chucks in each set.

4. A can lacquering machine including, in combination: a carrier rotatable about a horizontal axis; a plurality of sets of radially arranged can holding chucks carried by said carrier and rotatable thereon, each set including a plurality of chucks arranged longitudinally of the carrier; shafts 15 arranged longitudinally of the carrier and each operatively connected with the chucks of one of said sets; means for rotating said shafts to cause the rotation of the chucks; two series of spraying devices located adjacent the carrier, one series being arranged above the other, the number of spraying devices in each series corresponding to the number of chucks in each set; and means for operating each upper spraying device simultaneously with each lower spraying device.

5. A can lacquering machine including, in combination: a carrier intermittently rotatable about a horizontal axis; a plurality of radially extending, rotatable magnetized and flanged can holding chucks mounted on said carrier; shafts 15 arranged longitudinally of the carrier and each operatively connected with the chucks of one of said sets; means for rotating said shafts to cause the rotation of the chucks; and a spraying device, automatically controlled, to which the articles are brought successively by said chucks.

6. A can lacquering machine including, in combination: a carrier intermittently rotatable about a horizontal axis; a plurality of sets of radially arranged can holding chucks constantly rotatably mounted on said carrier and bodily movable therewith, each set comprising a plurality of chucks arranged in a series longitudinally of the carrier; shafts 15 arranged longitudinally of the carrier and each operatively connected with the chucks of one of said sets; means for rotating said shafts to cause the rotation of the chucks; and a plurality of spraying devices, stationary relatively to said carrier, the number of said devices corresponding to the number of chucks in each set.

7. A can spraying machine including, in combination: a carrier intermittently rotatable about a horizontal axis; a plurality of radially extending can holding chucks mounted on said carrier; means for constantly rotating said chucks, including a plurality of longitudinal shafts carried by said carrier, each of said shafts having a gear meshing with a gear on the chuck, each of said shafts having a pinion at the end thereof, and a constantly rotatable major gear engaging said pinions; and a spraying device to which cans carried by said chucks are brought successively.

8. A machine of the character described including, in combination: a series of circularly arranged shafts 15, means for rotating said shafts intermittently around a common center, means for rotating each shaft continuously, a circular series of can holding chucks mounted to turn intermittently with the said shafts, each chuck being geared with one of said shafts and rotated continuously thereby, and an intermittent spraying device arranged to direct a spray into the mouth of each can as it arrives at the spraying device.

9. A machine of the character described including, in combination: a carrier rotatable about a horizontal axis; can holding chucks bodily movable thereon; means for continuously rotating said chucks; and a spraying device delivering diagonally into the mouth of the can and against one side thereof, substantially as specified.

10. In a can coating machine, in combination: a carrier having a horizontal axis; means for intermittently rotating the same; radially extending chucks mounted on the carrier at intervals around its axis, each chuck having means for holding a can thereon with its open end outward and its side walls extending in radial directions from said carrier; means for rotating said chucks; a spraying device directed substantially tangentially toward the carrier; and means for automatically operating said spraying device when the same is directed into the open end of the can and against a side wall of the same.

11. In a can coating machine, in combination: means for holding a can and continuously rotating the same about its longitudinal axis while and after the same is sprayed; means for reversing said holding means and the can so that its upper end is turned downward and its lower end is turned upward while it is being axially rotated to cause both the axial and circumferential flow of the lacquer; and a can spraying device connected and coöperating with said reversing means to automatically spray the can.

12. In a can coating machine, in combination: means for holding a can and rotating the same about its longitudinal axis; means for reversing said holding means and the can so that its upper end is turned downward and its lower end is turned upward; and a can spraying device connected and coöperating with said reversing means to automatically spray the can, said can spraying device being directed, when it is operated, into the open end of the can and against the interior side wall of the same.

JOHN G. HODGSON.

Witnesses:
WILLIAM A. GEIGER,
ESTHER ABRAMS.